United States Patent [19]

Naito

[11] E Re. 28,959

[45] Reissued Sept. 14, 1976

[54] APPARATUS AND METHOD FOR MANUFACTURING TUBING FOR RECLOSABLE BAGS

[76] Inventor: Kakuji Naito, 23-1, 5-chome, Ayase, Adachi, Tokyo, Japan

[22] Filed: Sept. 30, 1975

[21] Appl. No.: 618,142

Related U.S. Patent Documents

Reissue of:

[64] Patent No.: 3,543,379
Issued: Dec. 1, 1970
Appl. No.: 662,344
Filed: Aug. 22, 1967

U.S. Applications:

[62] Division of Ser. No. 89,540, Feb. 15, 1961, Pat. No. 3,340,116.

[52] U.S. Cl. ..... 29/450; 29/200 B; 29/235; 29/238; 29/453

[51] Int. Cl.[2] ..... B23P 11/02

[58] Field of Search ..... 29/400, 450, 200 R, 29/453, 200 B, 200 P, 235, 455; 24/201 S, 201 C; 156/92, 251; 138/114, 115

[56] References Cited

UNITED STATES PATENTS

| | | | |
|---|---|---|---|
| 2,144,755 | 1/1939 | Freedman | 156/92 UX |
| 2,548,004 | 4/1951 | Duefrene | 24/201 S UX |
| 2,558,367 | 6/1951 | Madsen | 24/201 C UX |
| 2,635,332 | 4/1953 | Huntington | 29/235 |
| 2,666,466 | 1/1954 | Sharat | 156/92 UX |
| 2,770,032 | 11/1956 | Kelly | 29/235 |
| 2,990,875 | 7/1961 | Samuels et al. | 156/251 UX |
| 3,000,495 | 9/1961 | Downing | 138/114 UX |
| 3,033,257 | 5/1962 | Weber | 156/251 X |
| 3,198,228 | 8/1965 | Naito | 156/92 X |
| 3,291,177 | 12/1966 | Naito | 156/92 X |

FOREIGN PATENTS OR APPLICATIONS

| | | | |
|---|---|---|---|
| 2,743 | 4/1956 | Japan | 29/453 |

*Primary Examiner*—Charlie T. Moon
*Attorney, Agent, or Firm*—Hill, Gross, Simpson, Van Santen, Steadman, Chiara & Simpson

[57] ABSTRACT

Extruding tubular bag material having interlocking profiles thereon and guiding the profiles together flattening the tube and interlocking the profiles.

11 Claims, 17 Drawing Figures

INVENTOR
KAKUJI NAITO

BY Hill, Sherman, Meroni, Gross & Simpson ATTYS.

INVENTOR
KAKUJI NAITO

BY Hill, Sherman, Meroni, Gross & Simpson ATTYS.

INVENTOR
KAKUJI NAITO

BY Hill, Sherman, Meroni, Gross & Simpson ATTYS.

INVENTOR
KAKUJI NAITO

BY Hill, Sherman, Meroni, Gross & Simpson ATTYS.

INVENTOR
KAKUJI NAITO

BY Hill, Sherman, Meroni, Gross & Simpson ATTYS.

INVENTOR
KAKUJI NAITO

BY Dill, Sherman, Meroni, Gross & Simpson ATTYS.

APPARATUS AND METHOD FOR MANUFACTURING TUBING FOR RECLOSABLE BAGS

Matter enclosed in heavy brackets [ ] appears in the original patent but forms no part of this reissue specification; matter printed in italics indicates the additions made by reissue.

CROSS REFERENCES TO RELATED APPLICATIONS

This application is a division of my copending application Ser. No. 89,540, filed Feb. 15, 1961, now Patent No. 3,340,116.

BACKGROUND OF THE INVENTION

This invention relates to a method and apparatus for manufacturing plastic tubes for making bags. The tubes have shaped profiles integral with the plastic material on the inner surface thereof with the profiles being shaped so as to form a male rib and a female rib-receiving groove which are occlusive with respect to each other so as to form a reclosable bag from the tubing.

In making the tubular bag material it is molded into a long continuous tube obtained by extruding from an extruding die head under heated state through an extrusion gap in the die head. The die head is shaped to provide the profiles on the inner surface thereof integral with the plastic material of the tube. The tube is distended so that the walls do not touch by air within the tube and cooling means such as air blown surrounding the tube is provided to cool the tube body. The tube is then flattened by means of a pair of rolls.

In accordance with the present invention, the tube is then guided for interengaging the rib and groove profiles preferably in a continuous action as the flattened bag is received from the extruding and cooling apparatus.

The bag material which is now flat and maintaining its occluded state can be finished into individual bags by cutting followed by sealing the cut edges. In actual practice, however, owing to the necessity of accomplishing printing of such as trademarks, trade names, etc. on the bag surface, the bag material that has been formed in a flat and continuous state, as described hereinabove, is first wound up on a reel, transferred to the printing step where after printing it is rewound on the reel and thereafter cut and the cut edges simultaneously sealed.

BRIEF DESCRIPTION OF THE DRAWINGS

In FIG. 1, A is the synthetic resin extruder; B, the mold which serves as the extrusion outlet; C, the cold air discharge section; D, the engaging section; and E, the windup reel.

While the extruder A is constituted such that the synthetic resin material is extruded under a heated state, and it is possible to use one that is of a conventional structure, the extrusion outlet which serves as the mold B, as shown in FIG. 2, consists of a combination of an inverted truncated cone-shaped outer mold 1 and a core 3 such that a narrow annular extrusion opening or gap is formed therebetween. In the central bottom part of the core 3, an air inlet tube 4 is provided, while the bottom part of the outer mold 1 constitutes an introductory cavity 5 which communicates with the extruder A from which the synthetic resin is extruded and delivered via said introductory cavity 5 to the aforesaid extrusion gap 2. As shown in FIG. 3, there are formed molding grooves or profiles 7 and 8 in the outer surface of the core 3 communicating with the extrusion gap 2 for forming integrally with the bag body 6 the male and female ribs 10 and 9 for occlusive use.

Figure 2:
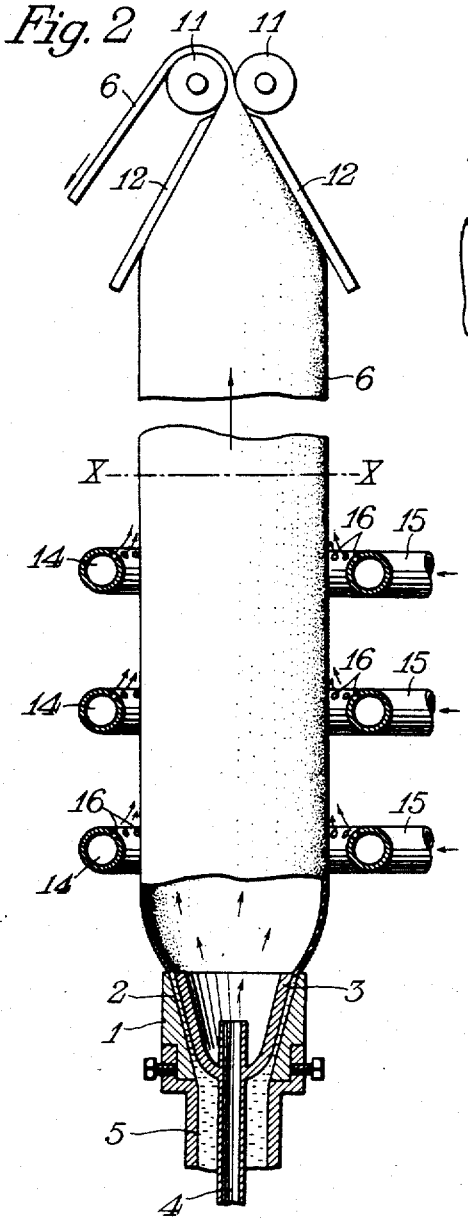
FIG. 2 is a detailed front elevation in section of that section which continuously molds the bag material.
Figure 5:
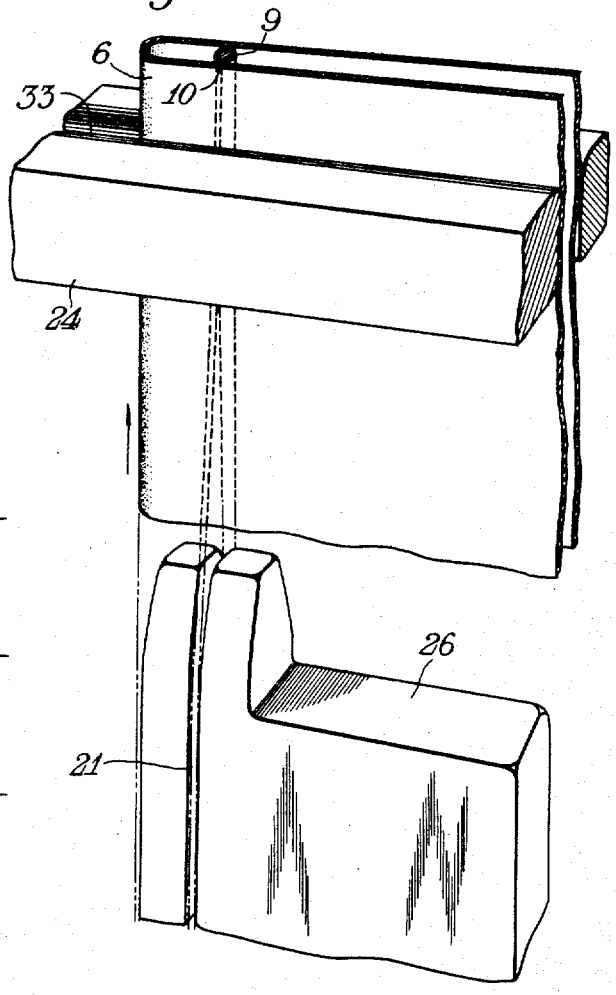
FIG. 5 is an explanatory view showing that section for engaging the occludent means.
Figure 6:
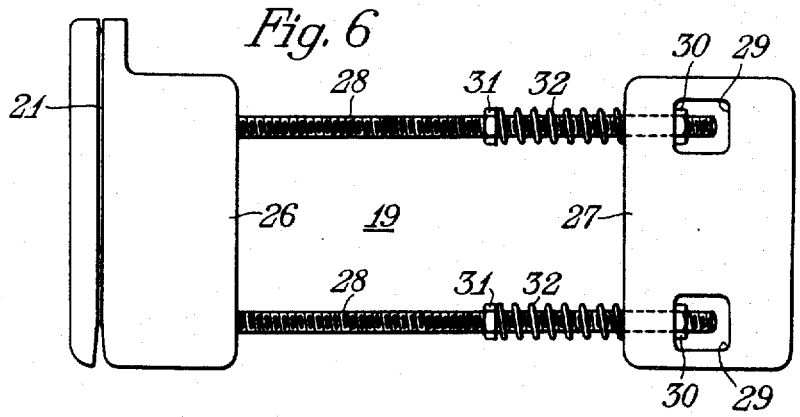
FIG. 6 is a front elevation of a guide for aligning the male and female ribs.

Directly above this mold B there is provided a pair of delivery or pinch rolls 11, 11 disposed in lateral fashion facing each other for clasping and delivering in a flat state the tubular bag body 6 that is extruded from the mold. And the apparatus is constituted such that, in the meantime, air is blown in small amounts into the tubular bag body 6 from the bottom through the aforesaid air inlet tube 4, and with the top part of the bag body 6 being held together by means of the delivery rolls 11, 11, the bag body 6 is swelled and maintained in a tubular shape. Below the rolls 11, 11 there is provided a pair of guide plates 12, 12 facing each other in roof fashion whereby the shoulder portion of the bag body 6 swelled into a tubular shape is guided and is gradually pressed flat as shown in FIG. 2 and passes between the rolls 11, 11. These guide plates 12, 12 are provided respectively with adjusting rods 13, 13 by which the angle of inclination of these guide plates are controlled.

At that part of the apparatus where the tubular bag body 6 ascends, a cold air discharge section C is provided. As illustrated in FIG. 2, several tiers of air supply pipes 14 are provided annularly surrounding the periphery of the tubular bag body 6, and the air is appropriately supplied to the annular pipes 14 from communicating pipes 15 and issues from numerous orifices 16 provided in the inner periphery of each of the air supply pipes 14 is blown against the outer surface of the bag body 6 to remove heat from the freshly molded film and thus cool the same.

Figure 1:
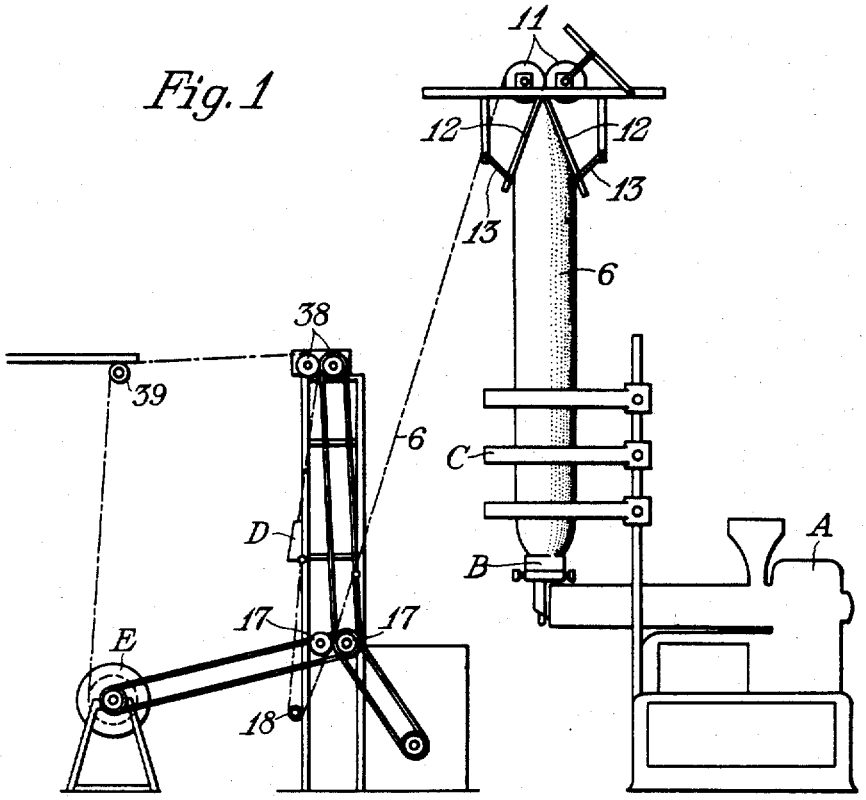
FIG. 1 is a side elevation showing an apparatus which continuously molds a bag material, occludes the male and female ribs thereof and while flattening the same into a flat belt-like shape winds it up.
Figure 3:
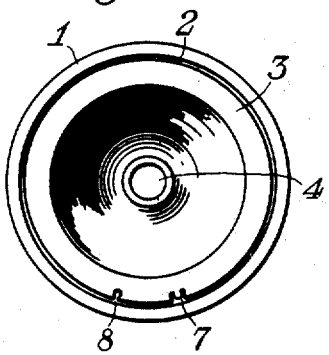
FIG. 3 is a top plan view of a mold section.
Figure 4:
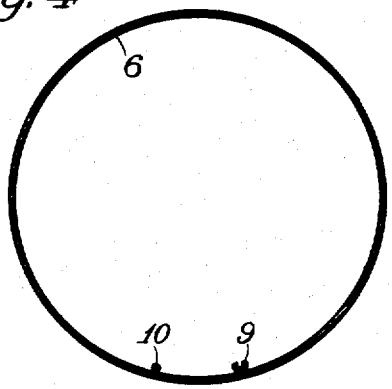
FIG. 4 is a cross-sectional view of the bag material taken along lines X—X of FIG. 2.
Figure 7:
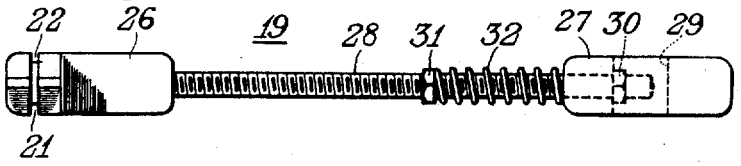
FIG. 7 is a top plan view of the above.
Figure 9:
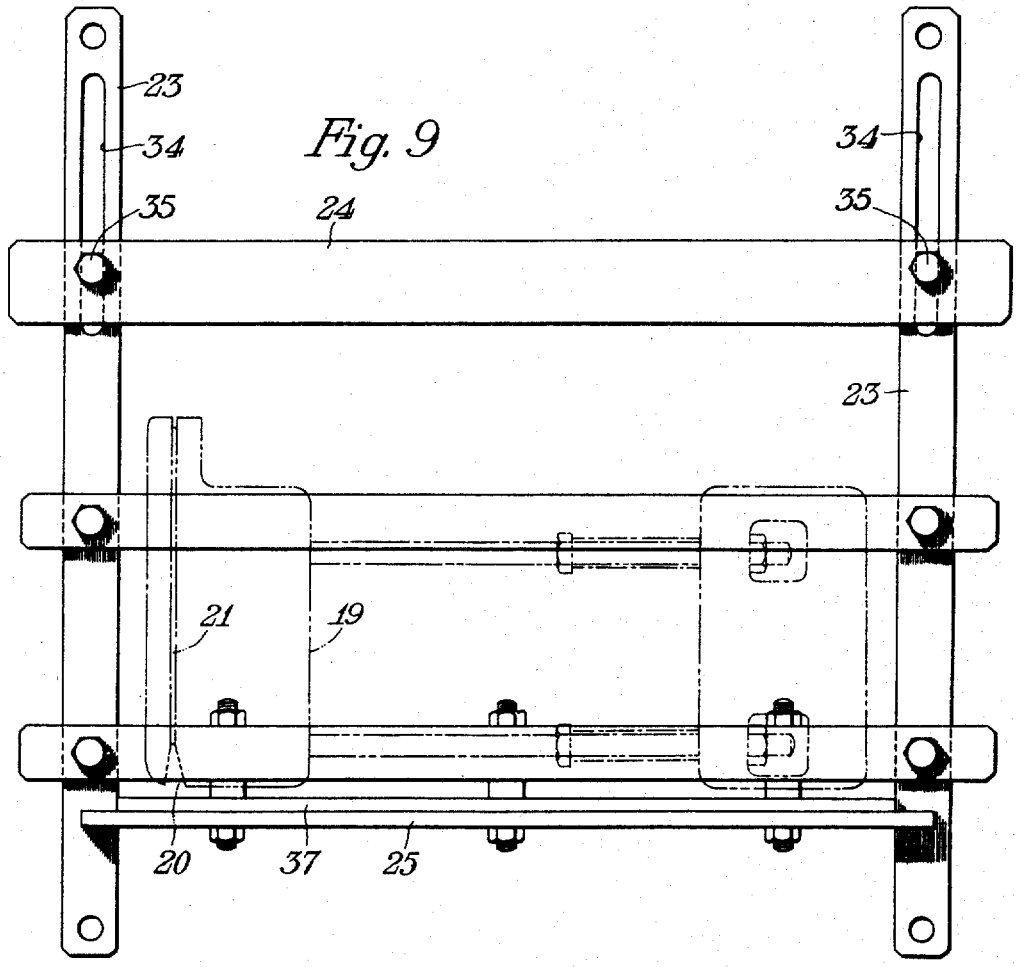
FIG. 9 is a front elevation illustrating the above relationship.
Figure 8:
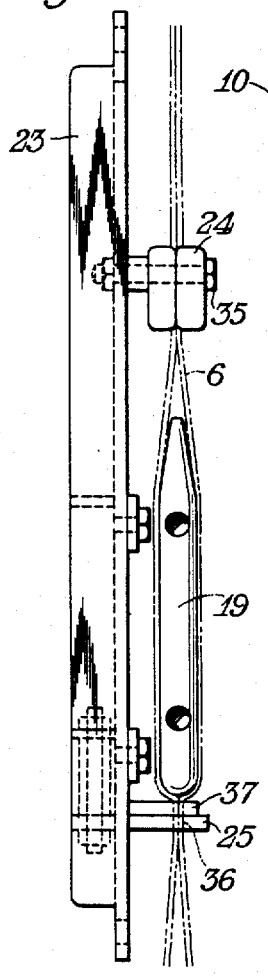
FIG. 8 is a side elevation showing the relationship between the above guide and that section for engaging the occludent means.
Figure 10:
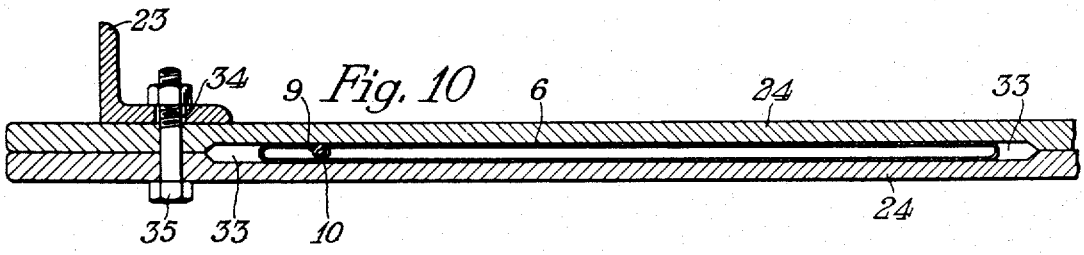
FIG. 10 is a top plan view in section of that section for engaging the occludent ribs.

The bag body 6 which leaves the delivery rolls 11, 11, as shown in FIG. 1, after passing through such as intervening guide rollers 17, 17 and 18 advances upward and is guided to the section for engaging the occludent ribs 9 and 10 which also may be termed rib and groove elements, the female rib has a groove therein for releasably interlockingly receiving the rib element. This section for engaging the occludent ribs D is constituted as shown in FIGS. 8, 9 and 10, and in first passing the end of the bag body 6 through this section, an aligning means or guide 19 is first of all inserted into the mouth of the tube where it is held therein. As is clear from FIGS. 5 to 9, the guide 19 is a device which is relatively flat whose sides are boat-shaped and having guide grooves 21, 22 which extend longitudinally along both sides thereof in the direction of the advance of the bag body wherein the male and female ribs fit in respectively from the wide mouth 20 at the bottom of guide 19 and travel therealong. If possible, the device preferably should be of suitable weight so that it will reside in the bag body 6 while maintaining to a certain extent its desired position by means of its own weight without hindering however the advance of said bag body 6. However, on account of the fact that the guide 19 is disposed in a position between a pair of engaging plates 24 and a retaining plate 25 mounted to the machine frame 23, even if its own weight is light, when disposed near the engaging plates 24, its position may be maintained in general at its proper place due to its relative position with respect to the engaging plates 24. Furthermore, if necessary, it is also possible to control the position of the guide 19 by providing at a position near its wedge-shaped portion at its top a pair of rollers rotating in an opposite direction to the direction of advance of the bag body 6 and in light contact with the outer surface of said bag body 6. Or alternatively, the utilization of magnetism is another possibility.

While the structure of the guide 19, as illustrated, consists of a combination having at its one end a plate 26 having guide grooves 21, 22 and at the other end a plate 27 connected by a pair of stud bolts 28 having screwed at one of their ends nuts 30 in a passage 29 formed in the latter plate 27 to which the stud bolts have been fitted as to extend therein, and springs 32 are provided on the stud bolts between the plate 27 and another pair of nuts 31 screwed to the middle portion of the stud bolts whereby the distance between the two plates 26 and 27 are regulated so as to adapt the above distance to conform with the width of the bag body 6, this regulating mechanism is not necessarily indispensable to the guide.

While rib and groove aligning means within the tube are illustrated as a preferred embodiment, it will be recognized from the description that an aligning means positioned outside of the tube acting to guide the rib and groove into alignment may be used.

The male and female ribs of the bag body 6 are guided to the proper position by means of the guide grooves 21, 22 of this guide 19 and their positions brought in register. And as the bag body 6 advances, by being pressed from both of its sides as it proceeds through the narrow gap 33 formed between the pair of engaging plates 24, the male and female ribs 9, 10 are made to engage with accuracy. These engaging plates 24 are mounted as to be easily attachable or detachable by means of bolts 35 in long openings 34 in the machine frame 23. On the other hand, the retaining plate 25 has a long groove 36 just sufficient for the free passage of the flat bag body 6 therethrough, and above said retaining plate a buoyant bed 37 consisting of such as felt or soft rubber for absorbing the shocks should the guide 19 make up-and-down oscillating movements.

Figure 11:
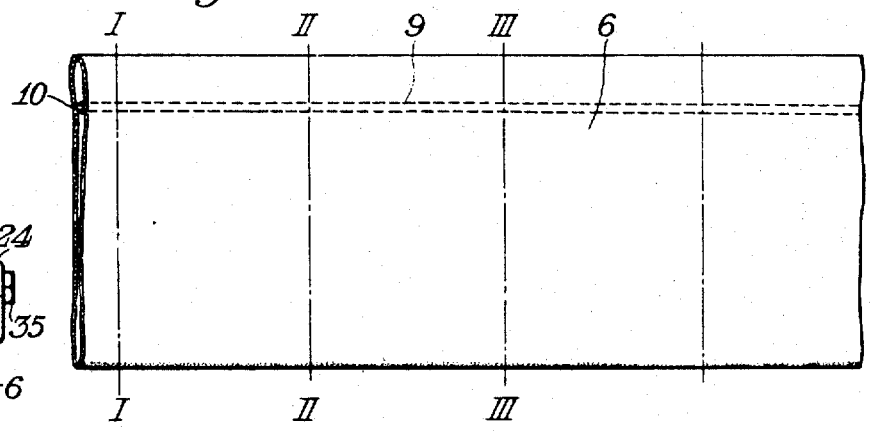
FIG. 11 is a top plan view showing the bag material subsequent to its having been occluded.

Since the bag body 6 which has thus passed through the gap 33 of the engaging plates 24 is flat with the male and female elements being in positive engagement, it is very convenient as the top and bottom edges can be accurately determined when cut across at the lines such as I—I, II—II and III—III, as shown in FIG. 11. It is also suitable when printing is to be applied to its surface since the misalignment in the print positions will not occur. The bag body 6, thus molded into a flat belt-like shape, may be immediately transferred to the bag manufacturing steps to be described hereinafter. In actual practice, however, since in most cases, printing of such as trademarks, trade names, etc. are accomplished, it is perhaps convenient to first wind up the bag material in this state by guiding the same to a windup reel E after passing over, as appropriate, the guide rollers 38, 38 and 39.

Figure 15:
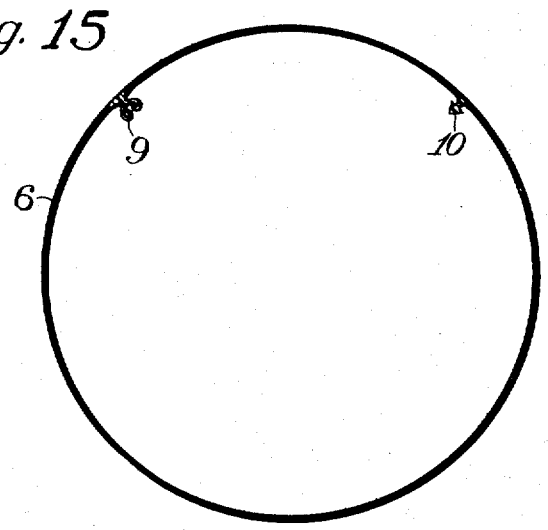
FIG. 15 is an enlarged sectional view showing a modification of the rib and grooves.
Figure 16:
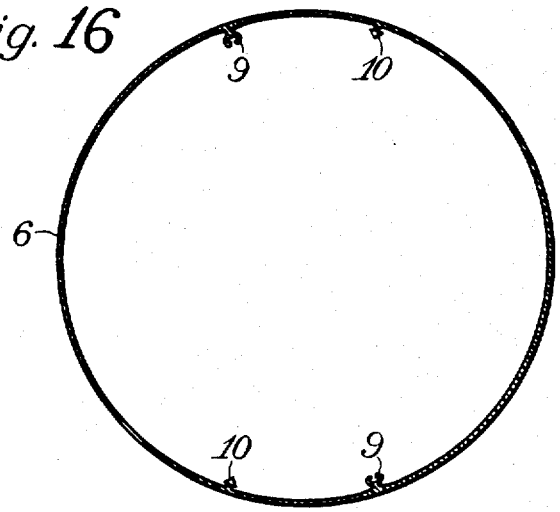
FIG. 16 is a cross-sectional view showing the bag material with two sets of ribs and grooves.
Figure 17:
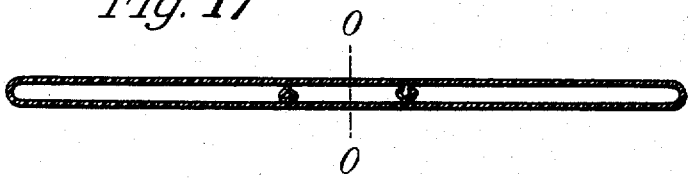
FIG. 17 is a sectional view showing the material of FIG. 16 in its flattened form.

In the hereinabove-described apparatus, the cross-sectional shape of the male and female ribs, suitable for occlusion of the bag body 6, can be obtained by suitably designing the configuration of the molding grooves 7, 8. The cross-sectional shape of these female and male ribs 9, 10 may be suitably determined in accordance with the uses to which the bags are to be put. For example, as shown in FIG. 15, for a container to be used for fine powders, the ribs may be so formed so that the labial section of the female rib 9 is turned inward along the length of the rib while the male rib 10 is formed arrowheaded. In addition, regardless of the shapes of the male and female ribs, when two sets thereof are formed facing each other, as illustrated in FIG. 16 and subsequently cut along line O—O midway between the two when the bag body has been flattened as in FIG. 17, two bags are obtainable at the same time. Needless to say, in this case the guide 19 to be used for occluding the ribs will be provided with guide grooves suitable for guiding the two sets of ribs simultaneously causing the occlusion thereof.

Figure 12:
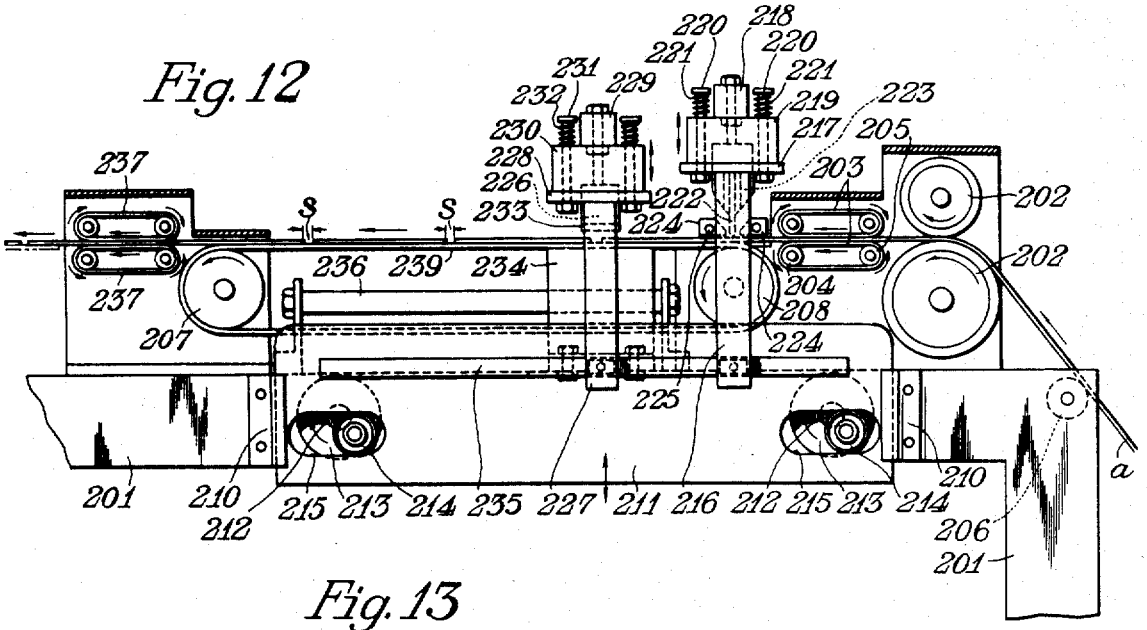
FIG. 12 is a front elevation showing an apparatus for forming individual bags from tubing.
Figure 13:
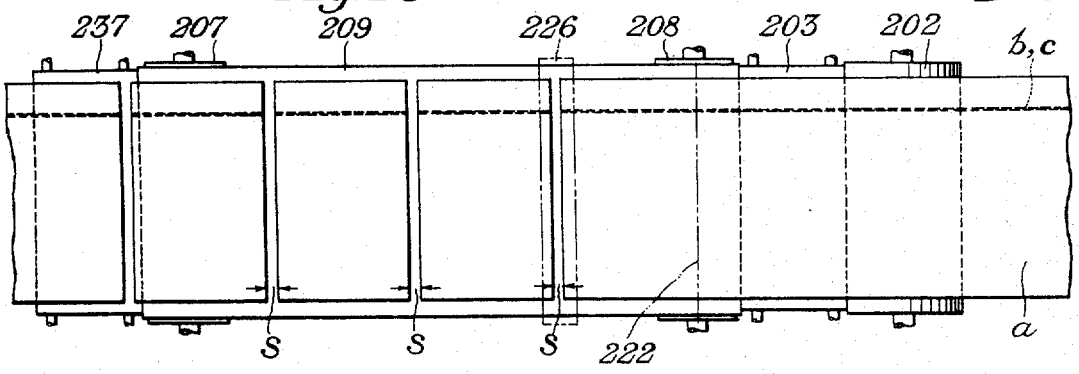
FIG. 13 is a top plan view showing the conveyor mechanism of FIG. 12.
Figure 14:
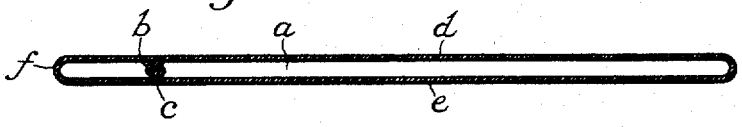
FIG. 14 is an enlarged sectional view of a bag.

The bag body that has been molded as described hereinbefore is then processed further in the following manner. First, by using a guide the male and female ribs that have been formed integrally in the bag body are occluded, than after flattening, to the surface of the bag body is imparted, if required, the desired printing and thereafter by using an apparatus to be described hereinafter the bag body is cut into the individual bag and simultaneously therewith the cut edges of the bags are heat sealed. The apparatus for accomplishing the cutting and heat sealing of the bags is illustrated in FIG. 12 et seq. in which: 201 is the machine frame, 202 are a pair of superposed delivery rollers disposed at one end of the machine frame, while 203 are a pair of superposed belts which by means of a pair of rollers 204, 205 disposed longitudinally travel at a rate equal to the peripheral speed of the rollers 202. The flat belt-shaped bag body 6 that is to be cut is conducted via a guide roller 206 to between the superposed delivery rollers 202 while their male and female ribs 9, 10 are being maintained in an occludent state, and then by being further passed between the superposed belts 203 the delivery of the bag body is achieved continuously at a constant speed.

In a position forward of this belt 203, rollers 207, 208 are disposed longitudinally, around which an endless conveyor belt 209 is mounted. The tip of the bag body 6 which is delivered forth, as described hereinbefore, is made to be transferred smoothly from the belt 203 to the radially moving part of the conveyor belt 209. The surface of this conveyor belt 209 by being imparted a layer of such as, for example, silicon rubber is maintained so that the bag body does not stick to the surface of the conveyor belt as a result of operations such as cutting and heat sealing. In addition, by suitable determination of the rotating speed of the rollers 207 208, the rate of travel of the conveyor belt 209 is made to be greater than that of the bag body 6. Underneath the conveyor belt 209 there is provided an elevator rack 211, which is held to the machine frame 201 by means of guide members 210 as to be capable of up-and-down movements. And by connecting this elevator rack with the delivery roller 202 through cooperatively coupled fore-and-aft rollers 214 mounted on their respective crank plates 213 provided on axles 212, which rollers 214, in turn are loosely fitted in elongated openings 215 of said elevator rack 211, this elevator rack is made to rise and fall with each rotation of the aforesaid axles 212. To this elevator rack 211 standards 216 are provided, and to a retaining plate attached to the top of said standards wing pieces 219 of a horizontal bar 218 are mounted. Two pairs of bolts 220 are freely fitted piercing the horizontal bar 218 and its wing pieces 219, and by intervening springs 221 between the head of the bolts 220 and the wing pieces 219, the horizontal bar 218 is coupled with the standards 216. Thus, when the blade 222 mounted in the horizontal bar 218 is to cut the bag body 6, the standards 216 that are held by the elevator rack 211 compresses the springs 221 and through the intervention of the bolts 220 descend somewhat more than the blade 222 as to result in the blade edge being strongly pressed in contact with the bag body 6 on account of the resilience of the spring 221. This blade 222 is disposed in the transfer section of the bag body 6, that is, in the neighborhood directly above the rear roller 208 of the conveyor belt 209, and its body proper is at all times heated to a suitable temperature by electrothermic means. For this purpose, an electrothermic means 223 is provided, which makes possible simultaneously with the cutting of the bag body the heat sealing of the cut edges. Further, also for the purpose of holding that portion along both sides of the line of cut and cooling the edges at the time of heat sealing and cutting, disposed on both sides of the edge of the blade 222 and separated therefrom by narrow gaps are provided a pair of pressure pieces provided for purpose of cooling capable of moving in unison with the blade 222. Water pipes 225 are connected respectively to these pressure pieces 224 for feeding cold water from one side and discharging the heated water to the other side. A pressure plate 226 is provided forward of the blade 222 at a distance equivalent to the width of one bag, the mounting of said pressure plate 226 being accomplished exactly as in the case of the aforesaid blade means. By means consisting of standards 277, a retaining plate 228, a horizontal bar 229, wing pieces 230, bolts 231 and springs 232 the pressure plate is mounted resiliently. It is desirable to provide at the lower face of the pressure plate 226 a cushion 233 such as of silicon rubber that does not stick to the cut portions of the bag material. Also, a wooden platen 234 is provided contiguous to the inner side of the conveyor belt 209 opposite the pressure plate. This pressure plate 226 and the platen 234 are so constituted as to be adjustable with regard to their positions in accordance with the width of the bag. In case of the pressure plate 226, this is made possible by providing for the lateral movement of the standards 227, which support the pressure plate 226, along a guide rail 235 of the elevator rack 211 and for securing the above standards at any optional position. On the other hand, the platen 234 can be adjusted as to its position by a lateral movement of the platen along a guide bar 236 mounted in the machine frame. Further, 237 are a set of superposed belts that have been provided forward of the conveyor belt 209 and have been provided for the purpose of removing the bags that have been conveyed by the conveyor belt 209.

In the hereinbefore described apparatus, when the delivery rollers 202 are rotated, since simultaneously with the travel of the belts 203, 237 and the conveyor belt 209, which cooperate therewith, the axles 212 rotate and the elevator rack 211 is caused to make up-and-down movements, if the bag body 6 is introduced to the delivery rollers 202 and between the belts 203, the bag body 6 is fed forward at a predetermined speed, and its tip is transferred to the top of the conveyor belt 209. Then, as the elevator rack 211 approaches the final stages of its descending movement, momentarily the traveling bag body is pressed down by the pressure pieces 224 provided for purpose of cooling and since simultaneously the bag body 6 is pressibly contacted with the blade 222, the bag body is cut by means of burning action at the line of contact of the blade while simultaneously the cut edges are closed by heat sealing at the cut edges of the top film and the bottom film. Instantly thereafter the pressure pieces 224 are provided for purpose of cooling and the blade 222 makes an ascending movement. Thus, since the pressing and cutting of the bag body 6 is completed almost instantaneously, even if in the meantime the bag body material is being continuously fed, as a matter of fact, there is no trouble caused at all. In addition, the fused material that adheres to the blade edge being burned up by itself and disappearing, the repeated use of the blade without further ado is possible without the attendance of any trouble.

When the continuous belt-like material is in this manner cut into predetermined widths starting at one end and the cut edges thereof are heat sealed, as a result of the fact that a unit width of a bag body leaves the bag body material and is placed independently upon the top of the conveyor belt 209, the cut edges become spaced apart automatically from each other for an S distance. Then, during the descent of the elevator rack 211 the cut and heat sealed edges are pressed between the pressure plate 226 descending from the top and the platen 234 disposed on the underside of the conveyor belt. Thus, inasmuch as it would be inconvenient to have unsatisfactorily heat sealed portions around that portion which is somewhat thicker than the other portions on account of the male and female ribs 9, 10 being located inside the bag body at this point, in order to preclude the possibility of such unsatisfactorily heat sealed portions to occur, pressure is applied to ensure the maintenance of a state of positive adherence of the cut edges. The bags which have been thus produced after being removed one by one from one end of the apparatus via the belts 237 and collected together are ready for use.

In using these bags, by cutting the bags at the top f and opening up the engagement of the male and female ribs, the bag is ready to be filled with whatever it is to be filled with. After the bags are filled the male and female ribs 9, 10 are again occluded, and if necessary, the mouth which was opened by cutting may be again sealed using a heat sealer.

While the invention has been described with particular reference to specific embodiments, it is to be understood that it is not to be limited thereto, but that changes may be made therein without departing from the scope of the invention which is defined in the appended claims.

I claim as my invention:

1. A mechanism for joining rib and groove shaped plastic interlocking mating profiles within a continuous tube of plastic material wherein the profiles are constructed so that the rib is interlockingly received within the groove profiles when the profiles are pressed together, comprising, means for advancing the tube axially along a path, joining means applying opposed forces to the outer surfaces of the tube forcing the profiles together, and aligning means in advance of said joining means aligning the opposed profiles so that the rib profile is in registry with the groove profile.

2. A mechanism for joining rib and groove shaped plastic interlocking mating profiles within a continuous tube of plastic material wherein the profiles are constructed so that the rib is interlockingly received within the groove profiles when the profiles are pressed together, comprising, means for advancing the tube axially along a path, opposed pressing means applying forces to the outer surface of the tube for forcing the profiles together, and a guiding means by which the profiles are aligned so that the rib profile is in registry with the groove profile being located within the tube ahead of said pressing means.

3. The method of joining rib and groove shaped plastic mating profiles within a closed continuous tube wherein the profiles are constructed so that the rib interlockingly receives the groove profile when the profiles are pressed together, comprising, advancing the tube relatively axially, applying opposed forces to the outer surfaces of the tube forcing the profiles together, and aligning the profils in advance of applying said forces so that the rib profile is in registry with the groove profile.

4. The method of joining rib and groove shaped plastic mating profiles within a closed continuous tube wherein the profiles are constructed so that the rib interlockingly receives the groove profile when the profiles are pressed together, comprising, advancing the tube relatively axially, applying opposed forces to the outer surfaces of the tube forcing the profiles together, and guiding said profiles from within the tube to aligned mating positions in advance of applying said forces so that the rib profile is in registry within the groove profile.

5. A mechanism for joining rib and grooved shaped plastic interlocking mating profiles within a continuous tube of plastic material wherein the profiles are constructed so that the rib is interlockingly received within the groove profiles when the profiles are pressed together, in accordance with claim 1, wherein said aligning means includes a member having recesses for receiving the profiles and maintaining them in alignment.

6. A mechanism for joining rib and groove shaped plastic interlocking mating profiles within a continuous tube of plastic material wherein the profiles are constructed so that the rib is interlockingly received within the groove profiles and the profiles are pressed together, in accordance with claim 1, wherein said path is vertical and said aligning means includes a guiding member within the tube guiding said profiles.

7. A mechanism for joining rib and groove shaped plastic interlocking mating profiles within a continuous tube of plastic material wherein the profiles are constructed so that the rib is interlockingly received within the groove profiles and the profiles are pressed together, in accordance with claim 1, wherein said aligning means includes a guide having grooves for receiving the profiles and a plate spaced from the guide with adjustable spacing means therebetween to adjust the distance between the guide and plate and maintain the tube in a flattened condition.

8. A mechanism for joining rib and groove shaped plastic interlocking mating profiles within a continuous tube of plastic material wherein the profiles are constructed so that the rib is interlockingly received within the groove profiles when the profiles are pressed together, in accordance with claim 1, wherein said advancing means flattens the tubes at a first location in advance of the aligning means with the profiles substantially in alignment before reaching said aligning means.

9. A mechanism for joining rib and groove shaped plastic interlocking mating profiles within a continuous tube of plastic material wherein the profiles are constructed so that the rib is interlockingly received within the groove profiles when the profiles are pressed together, in accordance with claim 5, wherein said recesses have a wider portion first receiving the profiles and taper to a more narrow portion for positioning the profiles.

10. A mechanism for joining rib and groove shaped plastic interlocking mating profiles within a continuous tube of plastic material wherein the profiles are constructed so that the rib is interlockingly received within the groove profiles when the profiles are pressed together and wherein the tube and the profiles are integrally formed of one piece and the profiles are within the tube, comprising, *a die for extruding a tube*, means for advancing the tube axially *from the die*, and means *positioned after the die* joining and interlocking said profiles within the tube *while advancing the tube from the die*.

11. A mechanism for joining rib and groove shaped plastic interlocking mating profiles within a continuous tube of plastic material wherein the profiles are constructed so that the rib is interlockingly received within the groove profiles when the profiles are pressed together, in accordance with claim 1, wherein said aligning means is located within the interior of the tube.

* * * * *